US012704455B2

(12) United States Patent
Clatot et al.

(10) Patent No.: US 12,704,455 B2
(45) Date of Patent: Aug. 11, 2026

(54) METHOD FOR PROCESSING CULLET USING COLORIMETRIC ANALYSIS

(71) Applicant: SAINT-GOBAIN ISOVER, Courbevoie (FR)

(72) Inventors: Richard Clatot, Aubervilliers (FR); Isabell Gross, Aubervilliers (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 158 days.

(21) Appl. No.: 18/252,463

(22) PCT Filed: Nov. 10, 2021

(86) PCT No.: PCT/FR2021/051989
§ 371 (c)(1),
(2) Date: May 10, 2023

(87) PCT Pub. No.: WO2022/106771
PCT Pub. Date: May 27, 2022

(65) Prior Publication Data
US 2024/0011895 A1 Jan. 11, 2024

(30) Foreign Application Priority Data
Nov. 17, 2020 (FR) ...................................... 2011757

(51) Int. Cl.
*G01N 21/25* (2006.01)
*C03B 1/00* (2006.01)
(Continued)

(52) U.S. Cl.
CPC ............... *G01N 21/25* (2013.01); *C03B 1/00* (2013.01); *C03B 5/005* (2013.01); *C03C 1/002* (2013.01);
(Continued)

(58) Field of Classification Search
CPC .... G01N 21/25; G01N 21/8851; C03B 5/005; C03B 1/00; C03B 1/002; C03B 2203/30;
(Continued)

(56) References Cited

U.S. PATENT DOCUMENTS 9,675,091 B1 * 6/2017 Eger ..................... G06T 7/0004
2004/0078110 A1 * 4/2004 Lehman .................... C03C 4/02 700/157
(Continued)

FOREIGN PATENT DOCUMENTS

EP 2 298 705 A2 3/2011

OTHER PUBLICATIONS

International Search Report as issued in International Patent Application No. PCT/FR2021/051989, dated Feb. 24, 2022.

*Primary Examiner* — Georgia Y Epps
*Assistant Examiner* — Erin R Garber
(74) *Attorney, Agent, or Firm* — CUSHMAN PARTNERS, LLC

(57) ABSTRACT

A method for processing cullet includes detecting a plurality of types of glass contained in the cullet using colorimetry, calculating a quantity of different types of glass detected in the cullet, determining a quantity of oxide and/or a redox potential which are associated with the cullet depending on the quantity of the different types of glass detected in the cullet.

9 Claims, 2 Drawing Sheets

(51) Int. Cl.

| | |
|---|---|
| ***C03B 5/00*** | (2006.01) |
| ***C03C 1/00*** | (2006.01) |
| ***G01N 21/88*** | (2006.01) |
| ***G06T 7/00*** | (2017.01) |
| ***G06T 7/90*** | (2017.01) |

(52) U.S. Cl.
CPC ....... *G01N 21/8851* (2013.01); *G06T 7/0004* (2013.01); *G06T 7/90* (2017.01); *C03C 2203/30* (2013.01); *Y02P 40/50* (2015.11)

(58) Field of Classification Search
CPC ............ C03B 4/02; G06T 2207/10024; G06T 7/0004; G06T 7/90
See application file for complete search history.

(56) References Cited

U.S. PATENT DOCUMENTS

| | | | | |
|---|---|---|---|---|
| 2005/0170944 | A1* | 8/2005 | Arbab | C03C 4/02 501/64 |
| 2006/0101856 | A1* | 5/2006 | Lehman | C03B 1/00 65/134.8 |
| 2006/0101857 | A1 | 5/2006 | Lehman et al. | |
| 2014/0130553 | A1 | 5/2014 | Duffy et al. | |
| 2019/0317022 | A1* | 10/2019 | Nnanna | G01N 21/17 |

* cited by examiner

| Type of glass | FeO[%]i | Redox |
|---|---|---|
| A | 0.018 | 0.32 |
| B | 0.007 | 0.33 |
| C | 0.23 | 0.75 |
| D | 0.24 | 0.48 |
| E | 0.34 | 0.78 |
| F | 0.46 | 0.77 |
| G | 0.16 | 0.76 |
| H | 0.17 | 0.7-0.8 |
| I | 0.18 | 0.75 |
| J | 0.009 | 0.12 |

METHOD FOR PROCESSING CULLET USING COLORIMETRIC ANALYSIS

CROSS-REFERENCE TO RELATED APPLICATIONS

This application is the U.S. National Stage of PCT/FR2021/051989, filed Nov. 10, 2021 which in turn claims priority to French patent application number 2011757 filed Nov. 17, 2020. The content of these applications are incorporated herein by reference in their entireties.

The present invention relates to the field of manufacturing mineral fibers from recycled glass, and more specifically relates to a method for processing cullet, with said method preceding the melting of the glass.

Samples of glass fragments, or cullet, are used for manufacturing various glass-based products. For example, in the field of insulation, mineral fibers are commonly used that are predominantly obtained from cullet. Cullet also can be used for manufacturing bottles and other glass containers.

Mineral fiber is manufactured following a method that firstly involves heating the cullet in a glass furnace, at a temperature that is sufficient for melting the glass, i.e., approximately 1,500° C. The molten glass is then placed in a centrifugation device of the fiber drawing plate type, leading to the creation of fibers that are bonded during their passage to a conveyor, on which they are then dried, cured and shaped.

The temperature of the furnace is not the only factor influencing optimal melting of the cullet. Indeed, the furnace is also configured according to a redox balance, or oxydoreduction balance, that is precise and is adapted to the cullet, in order to melt the cullet in a stable manner and without any impurities appearing. The ideal redox balance to be applied to the parameters of the furnace is, however, dependent on the composition of the cullet, namely which types of glass it contains and in which amounts.

It is known for the cullet to be visually monitored in order to determine the predominant type of glass. By way of an example, among the types of glass that are regularly found in cullet, clear or green or amber glass is commonly represented. Following this monitoring that is undertaken by the user, the glass furnace is configured accordingly so that the redox balance is adapted to the predominant type of glass.

The present invention falls within this context of configuring the furnace by proposing a method for processing cullet, characterized in that it comprises:

a step of detecting a plurality of types of glass contained in the cullet by colorimetry;

a step of computing an amount of the various types of glass detected in the cullet;

a step of determining an amount of oxide and/or a redox potential associated with the cullet as a function of the amount of the various types of glass detected in the cullet.

Thus, by virtue of such a method, the composition of the cullet is automatically determined, and its chemical composition is deduced. Knowing this, it is then possible to configure the furnace so that it is adapted for optimal melting of the cullet. It is thus possible to fully automate this method, and therefore to limit the risk of error.

The detection step is used to determine which types of glass are present in the cullet. Colorimetry detection is a method that allows the color of each of the fragments of the cullet to be precisely analyzed and that allows the type of glass relative to each of the detected colors to be deduced therefrom. In order to provide such detection, by way of an example, the cullet can be arranged facing an image acquisition device and can be illuminated by a light source, so that the cullet is arranged between the light source and the image acquisition device. According to another example, the light source and the image acquisition device can be arranged on the same side of the cullet. In such an example, the cullet is arranged on a reverberant base so that the image acquisition device can capture the light rays emitted by the light source. The light rays produced by the light source at least partially pass through each of the fragments of the cullet, and the transmitted light is then picked up by the acquisition device. By virtue of the infrared pick-up of the image acquisition device, the various types of clear glass can be detected, and not only the types of colored glass, for example, that are green or amber.

The various types of glass are identified via the colorimetry. An image of the cullet is then acquired and is subsequently used to determine the amount of the various types of glass in the cullet.

The method then continues by computing these aforementioned amounts. In other words, this computation step allows the relative distribution of each type of glass within the cullet to be determined. This computation particularly can be carried out using a measurement of the surface area of the various types of glass by virtue of the acquired image of the cullet.

Finally, the method carries out the step of determining the amount of oxide present in the cullet. An oxide is a compound combining a chemical element with oxygen. Within cullet, there are preponderant oxides such as silica, for example. Cullet also comprises metal oxides, such as iron oxide, copper oxide or chromium oxide, for example. More specifically, the presence of a particular oxide and its amount in the various types of glass is a parameter that influences the redox potential of the cullet and therefore the operation of curing the cullet in the glass furnace. Determining the amount of a particular oxide in the cullet therefore offers the possibility of adjusting the parameters of the glass furnace in order to proceed with optimal melting thereof. Thus, the aim of this step is to determine the amount of at least one type of oxide contained in the cullet in total. Thus, the amount of this iron oxide depends on the amount of each of the types of glass present in the cullet and determined during the computation step, with said types of glass each having a mass percentage of a particular oxide that is specific thereto.

According to one feature of the invention, the determining step of the method allows an amount of iron oxide associated with the cullet to be determined as a function of the amount of the various types of glass detected in the cullet.

In general, the amount of iron oxide is a constant relative to each of the various types of glass. Thus, it is possible to associate a mass percentage of iron oxide with each type of glass that is specific thereto and to use this information to configure the glass furnace accordingly.

According to one feature of the invention, the detection step involves a first phase of acquiring an acquired image of the cullet, then a second phase of colorimetric processing of said acquired image of the cullet. The first acquisition phase allows the acquired image of the cullet to be captured via an acquisition device. By way of an example, the acquisition device can be a camera.

According to one feature of the invention, the detection step can be preceded by a step of distributing the cullet. Ideally, in order to avoid falsifying the image acquisition and everything resulting therefrom as the method progresses, the glass fragments of the cullet advantageously must be distributed so as not to overlap. In other words, the cullet is distributed, or spread, so as to avoid overlapping several glass fragments with one another in order to obtain a qualitative image of the cullet.

According to one feature of the invention, the acquisition device is devoid of an infrared filter, and the acquisition is preferably carried out in a dark environment. In this way, the acquisition device, in particular by capturing the infrared rays, carries out more precise image capturing. According to such an arrangement, clear glass and the smallest fragments are thus detected more easily.

The second colorimetric processing phase occurs after the first acquisition phase, insofar as it requires the acquired image of the cullet in order to be carried out. It is during the second colorimetric processing phase that the color of each fragment of the cullet is detected.

The second colorimetric processing phase can be carried out via an image processing module. Colorimetric processing is understood to mean the use of all types of image processing module for obtaining a match for the shades of color appearing on an acquired image as encrypted or lettered data. The image processing module can be included in the acquisition device or even can be independent thereof. The image processing module is configured to receive the acquired image of the cullet in order to analyze said image.

According to one feature of the invention, the second phase of colorimetric processing of the acquired image of the cullet is carried out according to an HSV model and/or according to an RGB model. Either of the models can be used. If only one of the models is used, the HSV model is the most effective. However, preferably, it is advantageous to use the HSV model, then the RGB model in order to obtain optimal image processing.

The HSV color space is an acronym meaning Hue Saturation Value. Each datum of these three terms allows any color shade to be defined in the visible domain.

The Hue is a term that can be represented by a circle and is defined by a data range extending from 0 to 360°. Each degree represents a hue, according to the following table:

| Degree | Hue |
|---|---|
| 0° | Red |
| 60° | Yellow |
| 120° | Green |
| 180° | Cyan |
| 240° | Blue |
| 300° | Magenta |
| 360° | Red |

The Saturation is a term ranging between 0 and 1, reflecting the notion of the amount of color. Saturation approaching 0 will tend to be duller, while saturation approaching 1 will be more saturated.

The Value is also a term ranging between 0 and 1, reflecting the notion of brightness or luminosity. Any data having a value equal to 0 is associated with a black color. The closer the value is to 1, the clearer the associated color.

All the various HSV data can be represented by a 'spinning' cone, within which all the color shades of the visible domain can be converted in terms of HSV and all correspond to a point of the area of this 'spinning' cone. The Hue corresponds to the circumference of the cone, the Saturation corresponds to the radius of the cone, and the Value corresponds to the height of the cone.

The image processing module according to an ISV model processes the images obtained by the image acquisition device by considering only one datum of the HSV model, more specifically only the H datum of this HSV model.

The V datum of the HSV model also can be useful for distinguishing two types of glass that are different but have a similar color, with such a distinction being difficult to make with only the H datum of the HSV model.

Like the HSV model, the RGB model is based on the value of three items of data for defining each of the color shades in the visible domain. Each color is defined as a function of the value of each of the three primary colors used to define this color, namely red R, green G and blue B. Each of the RGB values ranges between 0 and 255.

Thus, the RGB model can be used to carry out the colorimetric processing on the acquired image of the cullet during the processing method, although this results in longer processing than processing using the HSV model since the three items of data of the RGB model must be computed in order to determine the color of each fragment of the cullet from the acquired image of the cullet. The RGB model also can be used following the HSV model in order to confirm or reject the color of each fragment of the cullet determined during the colorimetric processing via the HSV model.

According to one feature of the invention, during the computation step, as a function of the various types of glass detected by colorimetry, information representing the amount of each of the types of glass of the cullet is computed as a function of a surface area covered by each color specific to each type of glass of the cullet, with said surface area being measured on an acquired image of the cullet acquired during the detection step.

Total surface area must be understood to mean the sum of the surface areas of the various spots corresponding to the same color and therefore to a type of glass in particular. This surface area is therefore measured for each glass fragment of the cullet. The computation takes into account each of the fragments appearing on the acquired image of the cullet and computes the surface area of each of them by taking into account the resolution of the acquired image of the cullet, for example, in order to obtain the real surface area of the fragments in the case whereby the acquired image of the cullet modifies a size scale of said fragments.

Once the surface area of each fragment is measured, all the measured surface areas are sorted per type of glass in order to obtain a total surface area for each of the types of glass and to thus determine the amount of each of them.

According to one feature of the invention, during the computation step, the amount of the various types of glass that corresponds to a total volume specific to each of the types of glass of the cullet is computed as a function of said surface area. The computation of the volume is one example of a unit of measurement computed by virtue of the measurement of the surface area of the various types of glass in the cullet. In order to compute the volume of each fragment of the cullet, a thickness of each of them must be taken into account. In the case whereby the image acquisition device implemented by the invention does not allow three-dimensional images to be acquired, it is therefore not possible to directly determine the volume of each fragment of the cullet from the acquired image thereof. In order to overcome this, the inventors have determined that the volume of each fragment substantially relates to its surface area. By way of an example, the thickest, and therefore heaviest, parts of a glass bottle, such as the neck or the base, break less easily than the thinner, and therefore lighter, parts of the glass bottle. The fragments of the thickest parts thus tend to be fragments with a greater surface area than that of the fragments of the thinner parts. It is also possible to estimate the volume of the glass fragments, for example, via their color, insofar as each glass color can be specific to a use. By way of an example, the colored glass found in cullet tends to originate from bottles, while the clear glass instead originates from flat glass fragments, which on average are thicker than the glass of bottles. Thus, based on the surface area of each fragment of the cullet, it is possible to establish a distribution of the volume of each type of glass present in the cullet. Such a method means that it is possible to approach the actual distribution of the volume of each type of glass of the cullet, and without having to carry out long and laborious sorting of the cullet in order to determine the actual distribution of volume.

According to one feature of the invention, the surface area covered by each color specific to each type of glass of the cullet is computed as a function of a pixel size of an image acquisition device used for the first acquisition phase and of the number of pixels of a pattern corresponding to each of the colors. The computation of the surface area therefore depends on the features of the image acquisition device that is used. Each pixel of the acquired image of the cullet can be colored with a color relating to a glass fragment. If this is not the case, this means that there is no glass fragment in the vicinity of said pixel. Therefore, this pixel is not taken into account for computing the surface area of the fragments of the cullet.

The surface area can be computed by the image processing module, which will therefore detect the colors of the fragments of the cullet and also compute over how many pixels of the acquired image each of the detected colors extends. By multiplying the product of the number of pixels relative to each color of the fragments of the cullet by the size of the pixels determined by the type of acquisition device used, it is therefore possible to find the surface area of each color of the fragments of the cullet. Having done so, the relative distribution of the volume of each type of glass of the cullet is deduced therefrom.

According to one feature of the invention, the amount of oxide in the cullet is determined as a function of the total amounts of each of the types of glass of the cullet. In general, a considerable amount of oxides is present in the cullet and this influences the redox potential of the cullet. Knowing the amount of oxide, for example, the amount of iron oxide in the cullet, is therefore essential in order to subsequently achieve optimal melting of the cullet. The amount of oxide for each type of glass is a known constant, hence the advantage of establishing the relative volume of each type of glass within the cullet. By multiplying the volume of each type of glass of the cullet by its mass percentage of this specific oxide, for example, iron oxide, a specific amount of this oxide is found in the cullet that is specific to each type of glass. By adding each of these amounts and by multiplying the total by the density of the glass, the total amount of this specific oxide present in the cullet is found.

If the treated cullet is only a sample of an assortment of glass that is intended to be melted, the amount of specific oxide, and, for example, of iron oxide, that is obtained corresponds to a relative volume within the assortment of glass that is intended to be melted, and it is therefore possible to estimate the amount of specific oxide, and, for example, of iron oxide, present in the assortment of glass via a suitable computation.

The total amount of specific oxide, and, for example, of iron oxide, thus allows the parameters of the glass furnace to be adapted accordingly, in order to proceed with optimal melting of the glass and to subsequently obtain a quality finished product.

According to one feature of the invention, the redox potential of the cullet is determined as a function of a redox potential of each of the types of glass present in the cullet and of the amount of each of the types of glass of the cullet. The redox potential of each of the types of glass can correspond to the result of a ratio between the amount of iron (II) ions and the total amount of iron included within each of the types of glass. Like the mass percentage of iron oxide, the redox potential of each type of glass is a constant specific to each type of glass. Although iron oxide can be the element that is mainly responsible for the variation of the redox potential of the cullet, other metal elements exist that can be taken into account in order to determine the redox potential of the cullet, such as copper oxide or chromium oxide, for example.

Computing the redox potential of the cullet in addition, for example, to the amount of iron oxide can be useful insofar as two types of glass can have a similar color and have a mass percentage of iron oxide that is also similar, but can have a significant difference in terms of their respective redox potential.

According to one feature of the invention, the processing method can comprise a step of configuring a glass furnace intended to melt the cullet, the configuring step being subsequent to the step of determining the amount of oxide and/or the redox potential, said configuring being carried out as a function of the determined amount of oxide and/or of the redox potential associated with the cullet. Once the amount of oxide and/or the redox potential of the cullet is/are known, such results can be taken into account in order to manually configure the glass furnace, or even can be used during a fully automated process.

Depending on the results obtained during the preceding steps of the processing method, this configuring step involves adapting the furnace, for example, in terms of temperature or of redox balance, in order to optimally melt the cullet.

According to one feature of the invention, during the configuring step, a redox balance of the glass furnace is modified by adding additives, with the amount of said additives being a function of the amount of oxide and/or of the redox potential of the cullet. In order to proceed with optimal melting of the cullet, the redox balance of the furnace must be correctly adapted to the composition of the cullet intended to be melted. Thus, when melting the cullet, additives can be added in order to modify the redox balance of the furnace, with said redox balance preferably having to be maintained at a value that can range, for example, between two threshold values. The additives that are added are compounds capable of increasing or decreasing the redox potential of the cullet, for example, oxidizing agents.

The invention also covers a facility for manufacturing mineral fibers comprising at least one glass furnace and forming stations, wherein cullet is poured into the glass furnace in order to obtain molten glass intended to supply the forming stations, said facility implementing a method for processing cullet as described above.

Further features and advantages of the invention will become more apparent through the following description, on the one hand, and through several embodiments that are provided by way of a non-limiting indication with reference to the accompanying schematic drawings, on the other hand, in which:

FIG. 2 is a diagram for describing a system for measuring the volume of the fragments of the cullet;

Figure 1:
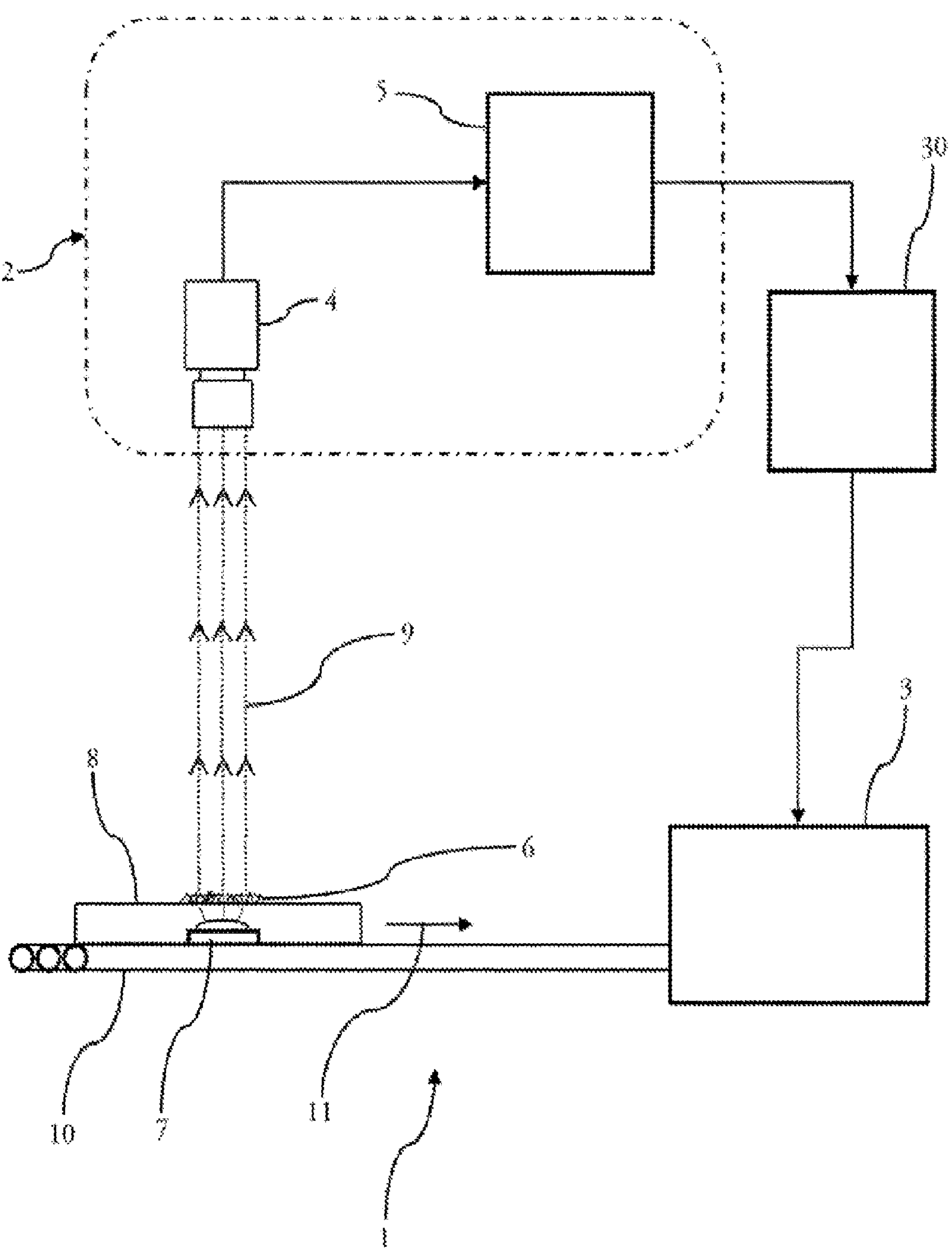
FIG. 1 shows an example of an arrangement of a facility for manufacturing mineral fibers implementing a method for processing cullet according to the invention.

FIG. 1 is an arrangement of a facility 1 for manufacturing mineral fibers. The facility 1 allows at least cullet 6 to be melted inside a glass furnace 3. Once melting is complete, the molten glass can circulate, for example, to a forming station, not shown herein, which ensures the formation of the mineral fibers. This is a non-exhaustive example, with the molten glass being able to be used to manufacture any other finished product derived from melting the cullet 6, such as, for example, bottles or flat glass.

Before being melted by the glass furnace 3, the cullet 6 can be moved, for example, via a conveyor 10 operating in a direction of movement 11. The direction of movement 11 is oriented toward the glass furnace 3.

The cullet 6 can correspond to an assortment of glass fragments that can be recycled or even to a sample of such an aforementioned assortment and that is intended to be melted. In the event that the cullet 6 corresponds to a sample taken from within the assortment of glass fragments, said sample has a distribution of various types of glass that is similar to the distribution of the various types of glass within the assortment of glass fragments.

The composition of the cullet 6 is an important factor for ensuring optimal melting thereof by the glass furnace 3. Indeed, depending on the types of glass present in the cullet 6, as well as the amounts of each of said types of glass in the cullet 6, it is possible to configure the glass furnace 3 in order to improve the melting of the glass fragments of the cullet 6. Poor configuration of the glass furnace 3 can lead to imperfect melting of the cullet 6, and subsequently to a finished product being manufactured that is not compliant or is of low quality.

In order to overcome the above, the cullet 6, before being melted inside the glass furnace 3, undergoes a processing method implemented by a processing system 2. The processing system 2 particularly comprises an image acquisition device 4 and an image processing module 5. These two elements allow at least one first step of the processing method to be implemented, which step is a detection step. Such a detection step is divided into a first acquisition phase and a second colorimetric processing phase.

The image acquisition device 4 can be a camera, for example, the purpose of which is to capture an image of the cullet 6 moving on the conveyor 10 in order to implement the first acquisition phase. In order to obtain an acquired image of the cullet 6 so that it can be subsequently processed correctly, the cullet 6 must be correctly illuminated so that the image acquisition device 4 can capture a clear image. To this end, it is possible to arrange the cullet 6 on a support 8, for example. Therefore, it is the support 8 that is placed on the conveyor 10. The support 8 comprises a light source 7 that illuminates the cullet 6. Thus, the light rays emitted by the light source 7 pass through the support 8 by transparency, then pass through each glass fragment of the cullet 6. In order to allow the light rays to pass through the support 8, said support has a transparent base on which the cullet 6 rests. This results in a plurality of transmitted light rays 9, which, after having passed through the cullet 6, are picked up by the image acquisition device 4.

In the event that the cullet 6 corresponds to a sample of an assortment of glass fragments, the image of the cullet 6 can be acquired outside the conveyor 10, with a fixed support 8 on which the cullet 6 rests. Once the processing is complete, the cullet 6 is then placed on the conveyor 10.

Advantageously, the image acquisition by the image acquisition device 4 can be carried out in a darkened environment, in order to obtain a clear acquired image of the cullet 6 and to subsequently allow all the various types of glass to be correctly distinguished, as well as all the fragments, including the smallest fragments. Moreover, the image acquisition device in this case is devoid of an infrared filter for correctly distinguishing the fragments of clear glass from the zones without fragments.

In FIG. 1, the cullet 6 is arranged on the support 8, which itself contains the light source 7. However, it is possible, for example, to install a transparent conveyor 10 comprising the light source 7, with the cullet 6 being placed directly on the conveyor 10. The light source 7 is thus arranged opposite the conveyor 10 relative to the cullet 6 and to the image acquisition device 4. The transparency of the conveyor 10 thus guarantees that the light rays pass through the conveyor as well as the cullet 6, until they reach the image acquisition device 4.

Advantageously, the glass fragments of the cullet 6 are, before they pass in front of the light source 7, distributed over the whole of the support 8 so as to avoid or at least limit any overlapping thereof, so that the image can be correctly acquired for the whole of the cullet 6. In particular, yet without this limiting the invention, the support 8 and the cullet 6 arranged therein can pass over a station where a comb can ensure proper distribution of the cullet 6 over the entire support 8.

Once the acquired image of the cullet 6 has been obtained, it is transmitted to the image processing module 5. The particular function of said module is to detect the color of each of the glass fragments of the cullet 6, in order to determine to which type of glass said fragments correspond. The image processing module 5 can particularly detect several types of different glass, despite the fact that said types of glass have a similar color with respect to one another. This is the second colorimetric processing phase of the detection step.

In order to correctly detect the various types of glass of the cullet 6, the detected colors can be compared, for example, with a database of the image processing module 5 in order to deduce therefrom the type of glass associated with each of the detected colors. In the event of indecision, for example, if the detected color does not exactly correspond to a specific type of glass, the image processing module 5 can associate the glass fragment with a type of glass whose color is closest to the detected color, or even classify the glass fragment in a separate category, with said category consolidating the glass fragments whose color has not been identified as being clearly specific to a particular type of glass. The database can be refined over time.

The image processing module 5 can detect the various types of glass via an HSV, RGB model, or even a combination of the two models. The HSV model is advantageous in the sense that only the value H can be computed in order to detect the various types of glass, while the RGB model requires the three items of data of the model to be computed. When used in combination, the HSV model and the RGB model allow dual detection to be carried out. Each of the fragments of the cullet 6 is thus detected as corresponding to a specific type of glass. In general, within cullet 6, the glass colors found most often are clear glass, green glass and amber glass. However, there can be several types of glass with a color substantially identical to one another. Colorimetry analysis allows these various types of glass to be distinguished from one another, despite their similar color.

The image processing module 5 also can be capable of determining the amount of the various types of glass present in the cullet 6, for example, the total relative volume of each of the types of glass within the cullet 6. The volume of a specific type of glass, in particular in the case of a two-dimensional acquired image, is determined by referring to the total surface area of the glass fragments whose detected color corresponds to that of this type of glass, with said surface area being computed as a function of the number of pixels in the acquired image that are associated with this color. Taking into account the surface area allows an estimated datum to be deduced therefrom of the thickness of each type of detected glass and on this basis allows a volume associated with this type of specific glass to be determined. In other words, for each of the types of glass of the cullet 6, the volume of a type of glass is a function of the number of pixels involved in forming a pattern of a color corresponding to this type of glass. Such a correlation was established by the inventors and yields a result that is more or less similar to the real volume of each of the types of glass within the cullet 6.

The total relative volume of each of the types of glass is also dependent on a resolution of the image acquisition device 4. Indeed, as a function of said resolution, the number of pixels and the size of the pixels differs from one image acquisition device model 4 to the next. Such data are provided in a technical description of the image acquisition device 4.

By way of an example, in order to determine the volume of a type A glass found in the cullet 6, the number of pixels that are identified as being associated with the color associated with the type A glass is determined via the image processing module 5, then this number of pixels is multiplied by the size of a pixel. A surface area corresponding to a spot on the image of said color is thus computed. Then, a volume corresponding to this type A glass is determined, on the basis of a computation mode defined by the inventors that will be described below.

The volume of each of the types of glass is an example of a quantitative value for computing the amount of the various types of glass in the cullet 6. Other measurements can be carried out in order to determine the amount of each of the types of glass of the cullet 6 on the basis of the measurement of the surface area of the fragments of the cullet 6.

FIG. 2 shows an example of determining the surface area of the glass fragments of the cullet. FIG. 2 schematically shows part of the acquired image 16 of the cullet, after the image acquisition device has captured an image of the cullet.

In FIG. 2, it is possible to see a first fragment 12 and a second fragment 13, both forming part of the processed cullet. A grid 15 allows a set of pixels 14 to be virtually shown.

Thus, after the image processing module has received the acquired image 16 and has identified all the types of glass present in the cullet by colorimetry, the objective is to determine the surface area of all the fragments of the cullet in order to deduce their volume therefrom.

The image processing module therefore analyzes each of the fragments by determining over how many pixels 14 they extend. Depending on the resolution of the image acquisition device, a particular fragment can extend over more or less pixels 14, hence the importance of taking into account the resolution of the image acquisition device in the computation.

By virtue of the correlation established by the inventors between the surface area and the volume, it is possible to estimate the volume of each of the fragments of the cullet, and this is only on the basis of the two-dimensional acquired image 16. According to the example of FIG. 2, the second fragment 13 has a greater surface area than the first fragment 12.

The volume of each of the glass fragments is determined as a function of a correlation between the surface area of the fragment and its thickness. In other words, the thickness of each of the fragments is deduced as a function of its respective surface area. Such a correlation is deduced from the fact that the higher the surface area of a glass fragment, the thicker said fragment tends to be. This correlation can be established so that when a fragment has a given surface area, the analysis of the value of this surface area allows the fragment to be classified in a class with which a given thickness is associated. Alternatively, a multiplier coefficient can be applied to the surface area in order to deduce a thickness therefrom. Determining the thickness of the fragment combined with the value of the surface area determined by the image processing allows the volume of said fragment to be subsequently deduced therefrom. With reference to the example illustrated in FIG. 2, after the image processing module has analyzed that the second fragment 13 has a greater surface area than that of the first fragment, a thickness corresponding to each fragment is determined, with a thickness value of the first fragment that is lower than the thickness value of the second fragment with reference to the predictive model provided by the inventors. Finally, the volumes are computed and the second fragment 13 has a larger volume than the first fragment 12.

Once the volumes of each of the fragments appearing on the acquired image 16 are computed, said volumes are added per type of detected glass. For example, if the first fragment 12 and the second fragment 13 were detected by colorimetry as being the same type of glass, their respective volume is added together, as well as to the volume of all the fragments of said type of glass detected on the acquired image 16. If the first fragment 12 and the second fragment 13 correspond to two types of glass that are distinct from each other, the volume of the first fragment 12 is added to the volume of the fragments corresponding to the type of glass of the first fragment 12 and the volume of the second fragment 13 is added to the volume of the fragments of the same type of glass.

Once the sum of the volumes of the fragments of the cullet is carried out for each type of glass, the step of computing the processing method is then terminated.

The following step is a step of determining an amount of oxide and/or a redox potential associated with the cullet as a function of an amount of the various types of glass detected in the cullet. Such a step can only be carried out once the various types of glass are detected, as well as their respective volumes. By way of an example, the amount of iron oxide and the redox potential of each of the types of glass is provided by way of information in FIG. 3.

Iron oxide is a chemical element that influences the redox potential of the cullet, and for this reason influences the melting of the cullet by the glass furnace. Therefore, it is important to control the amount of iron oxide in the cullet in order to configure the furnace accordingly and thus carry out optimal melting of the cullet. In general, the amount of all types of oxides present in the cullet can be determined. Each amount of oxide, and, according to the example of FIG. 3, of iron oxide, is determined by a constant mass percentage within each type of glass.

Figure 3:
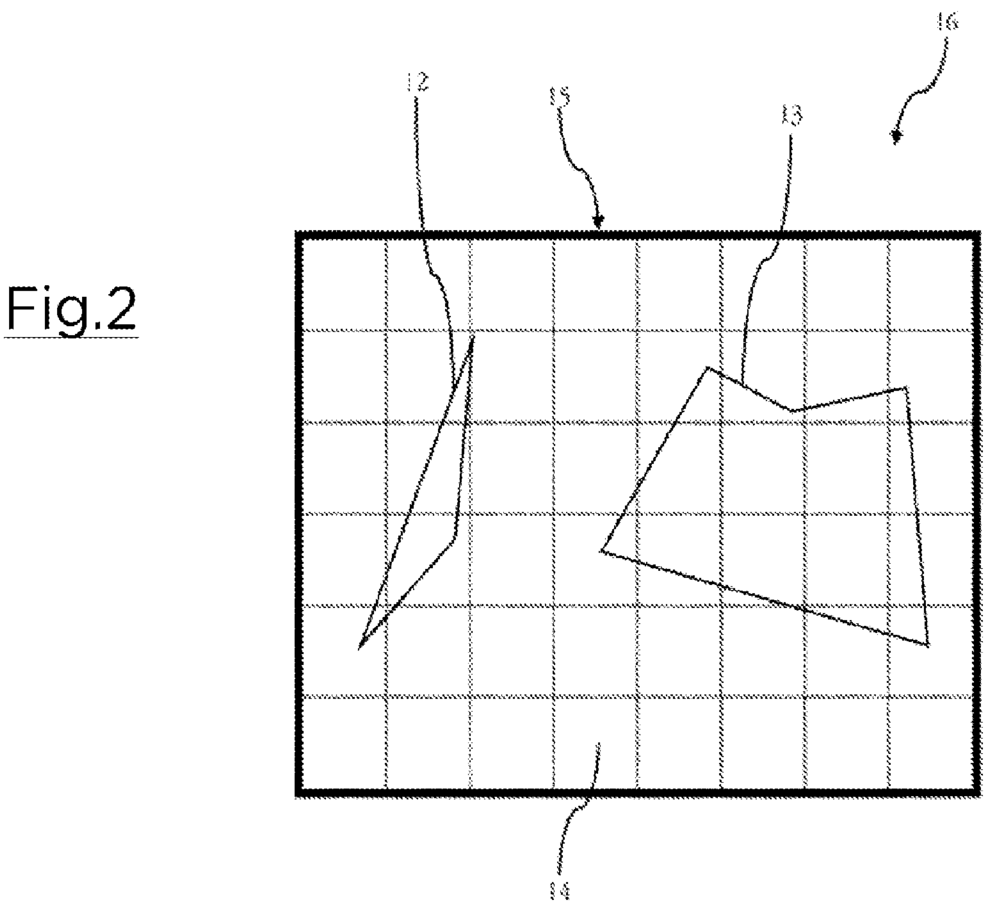
FIG. 3 is a table listing a mass percentage of iron oxide and a redox potential for each type of glass that can be found in the cullet.

Within the table of FIG. 3, several types of glass are listed and classified by color shade. Thus, two types of clear glass are listed as the type A and B glass, four types of green glass are the type C, D, E and F glass, three types of amber glass are the G, H, and I type glass, and a blue type of glass is the type J glass. Each of these types of glass has an invariable mass percentage of iron oxide. According to the table of FIG. 3, it is thus possible to derive trends therefrom, in particular that the iron oxide is present in a very small amount within the clear glass and the blue glass and in a greater amount within the amber glass. It is within the green glass that a greater amount of iron oxide is present. Cullet comprising a significant amount of green glass fragments therefore has a greater overall amount of iron oxide than cullet with the same total mass, but where the green glass is in the minority.

The total amount of iron oxide present in the cullet is computed according to the following formula:

$$FeO_{tot} = \rho_{glass} \times \sum (volume_i \times FeO_{[\%]i}),$$

with $\rho_{glaas}$, being the density of the glass, $volume_i$ being the volume of each of the types of glass computed during the detection step, and $FeO_{[\%]i}$ being the mass concentration of iron oxide of each of the types of glass that are found in the table of FIG. 3. Thus, by multiplying the volume of each of the types of glass by its own mass concentration of iron oxide, then by adding each of these resulting products, then by multiplying the whole by the density of the glass, the total amount of iron oxide present in the cullet is found. Such an amount subsequently can be proportioned if the cullet only corresponds to a sample representing a more extensive assortment of glass fragments. Such a computation also can be applied for determining the amount of any other type of oxide present in the cullet.

Such a computation also can be carried out alternatively or additionally via the redox potential of each of the types of glass, in order to obtain the redox potential associated with the cullet. As can be seen, the redox potential of each of the types of glass is not proportional to the mass concentration of iron oxide. This is particularly because other elements exist that are able to vary the redox potential of each of the types of glass within said types of glass, such as, for example, copper oxide or chromium oxide.

It particularly can be seen that despite a substantially identical mass percentage of iron oxide, the redox potential of the glass C and of the glass D differs greatly relative to one another, with this difference being able to be explained by the presence of a greater amount of reducing agent for the glass D, or even by the presence of a total amount of iron that is greater for the glass D, with the redox potential being able to be computed by determining the ratio between the amount of $Fe2+$ ions and the total amount of iron for each of the types of glass. The decision to compute the total amount of oxide or the redox potential associated with the cullet can depend, for example, on the composition of the cullet.

With this being the case, the step of determining the amount of oxide and/or the redox potential associated with the cullet as a function of the amount of the various types of glass detected in the cullet is completed.

With further reference to FIG. 1, it can be seen that the image processing module 5 can communicate with a control module 30, in order to transmit the amount of oxide present in the cullet 6 or the redox potential thereof.

The control module 30 is able to receive the aforementioned information and to modify the parameters of the glass furnace 3 accordingly. Thus, the parameters of the glass furnace 3 can be modified as a function of the composition of the cullet 6, in order to cause optimal melting of the cullet. A redox balance of the glass furnace 3 particularly can be modified in order to be adapted to the redox potential or to the amount of oxide of the cullet 6. The redox balance of the glass furnace 3 can be modified, for example, by adding additives, for example, oxidizing agents, in order to reduce the oxidation of the cullet 6. This is a step of configuring the glass furnace 3.

As shown in FIG. 1, this additional step can be fully automated so that the control module 30 can automatically modify the parameters of the glass furnace 3 as a function of the results provided by the processing module 5. Without departing from the scope of the invention, the instructions for configuring the glass furnace 3 also can be carried out directly by the processing module 5. The glass furnace 3 also can be configured manually by an operator. In this respect, the processing module 5 can comprise, for example, a results display screen read by the operator, who then may or may not modify the parameters of the glass furnace 3 accordingly.

The parameters of the glass furnace 3 can be modified in an absolute manner, i.e., individually relative to each new cullet 6 intended to be melted. The parameters of the glass furnace 3 also can be modified in a relative manner, i.e., they are modified as a function of a difference in the results between the cullet 6 and a cullet previously melted by the same glass furnace 3. If the difference in the amount of oxide or of redox potential between the two cullets 6 is too great, the parameters of the glass furnace 3 are modified accordingly, the parameters of the glass furnace 3 are maintained as such.

Of course, the invention is not limited to the examples that have just been described and a number of adjustments can be made to these examples without departing from the scope of the invention.

The invention, as described above, clearly achieves its stated aim, and allows a method to be proposed for processing cullet ensuring it is optimally melted. Alternative embodiments not described herein could be implemented without departing from the scope of the invention, as long as, in accordance with the invention, they comprise a processing method according to the invention.

The invention claimed is:

1. A method for processing cullet, comprising:

detecting a plurality of types of glass contained in the cullet by colorimetry, the detecting involving a first phase of acquiring an acquired image of the cullet, then a second phase of colorimetric processing of said acquired image of the cullet, a surface area covered by each color specific to each of the plurality of types of glass of the cullet being computed as a function of a pixel size of an image acquisition device used for the first phase and of a number of pixels of a pattern corresponding to each of the colors;

computing an amount of the plurality of types of glass detected in the cullet, and determining an amount of oxide and/or a redox potential associated with the cullet as a function of the amount of the plurality of types of glass detected in the cullet.

2. The processing method as claimed in claim 1, wherein, during the computing, the amount of the plurality of types of glass that corresponds to a total volume specific to each of the types of glass of the cullet is computed as a function of said surface area.

3. The processing method as claimed in claim 1, wherein the second phase of colorimetric processing of the acquired image of the cullet is carried out according to an HSV model and/or according to an RGB model.

4. The processing method as claimed in claim 1, wherein the amount of oxide in the cullet is determined as a function of the amount of each of the plurality of types of glass of the cullet.

5. The processing method as claimed in claim 1, wherein the redox potential of the cullet is determined as a function of a redox potential of each of the plurality of types of glass present in the cullet and of the amount of each of the plurality of types of glass of the cullet.

6. The processing method as claimed in claim 1, further comprising configuring a glass furnace intended to melt the cullet, the configuring being subsequent to the determining of the amount of oxide and/or the redox potential, said configuring being carried out as a function of the determined amount of oxide and/or of the redox potential associated with the cullet.

7. The processing method as claimed in claim 6, wherein, during the configuring, a redox balance of the glass furnace is modified by adding additives, with an amount of said additives being a function of the amount of oxide and/or of the redox potential of the cullet.

8. A facility for manufacturing mineral fibers comprising at least one glass furnace and forming stations, wherein the cullet is poured into the glass furnace in order to obtain molten glass intended to supply the forming stations, said facility implementing the method for processing the cullet as claimed in claim 1.

9. The processing method as claimed in claim 1, wherein, during computing, as a function of the plurality of types of glass detected by colorimetry, information representing the amount of each of the plurality of types of glass of the cullet is computed as a function of the surface area covered by each color specific to each type of glass of the cullet, with said surface area being measured on the acquired image of the cullet acquired during the detecting.

* * * * *